C. D. RICHARD.
HUB ODOMETER.
APPLICATION FILED DEC. 15, 1917.
1,326,967.
Patented Jan. 6, 1920.
2 SHEETS—SHEET 1.
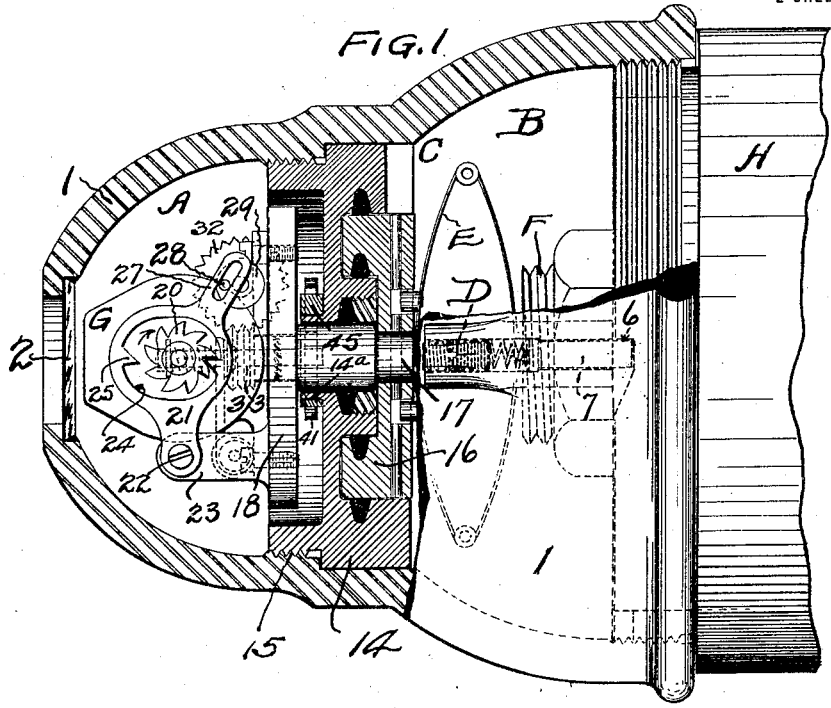
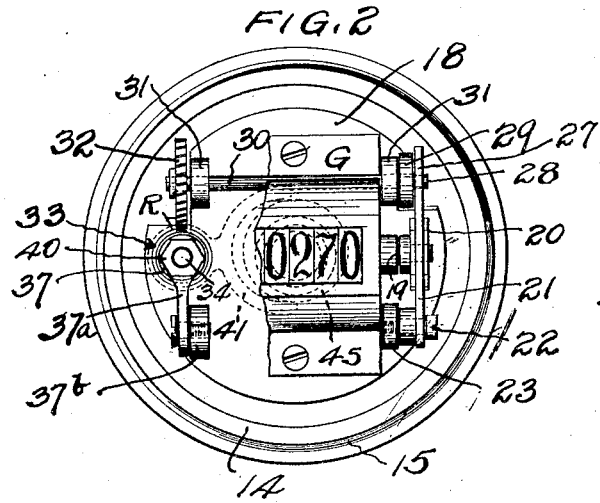
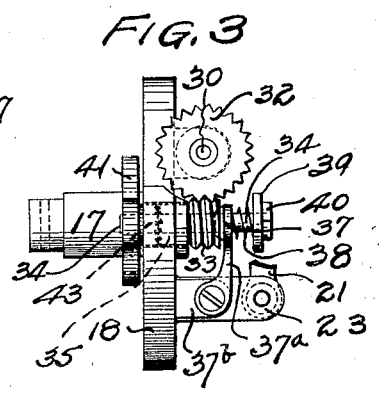
WITNESSES:
INVENTOR
CHARLES D. RICHARD
BY
ATTORNEY C. D. RICHARD.
HUB ODOMETER.
APPLICATION FILED DEC. 15, 1917.
1,326,967.
Patented Jan. 6, 1920.
2 SHEETS—SHEET 2.
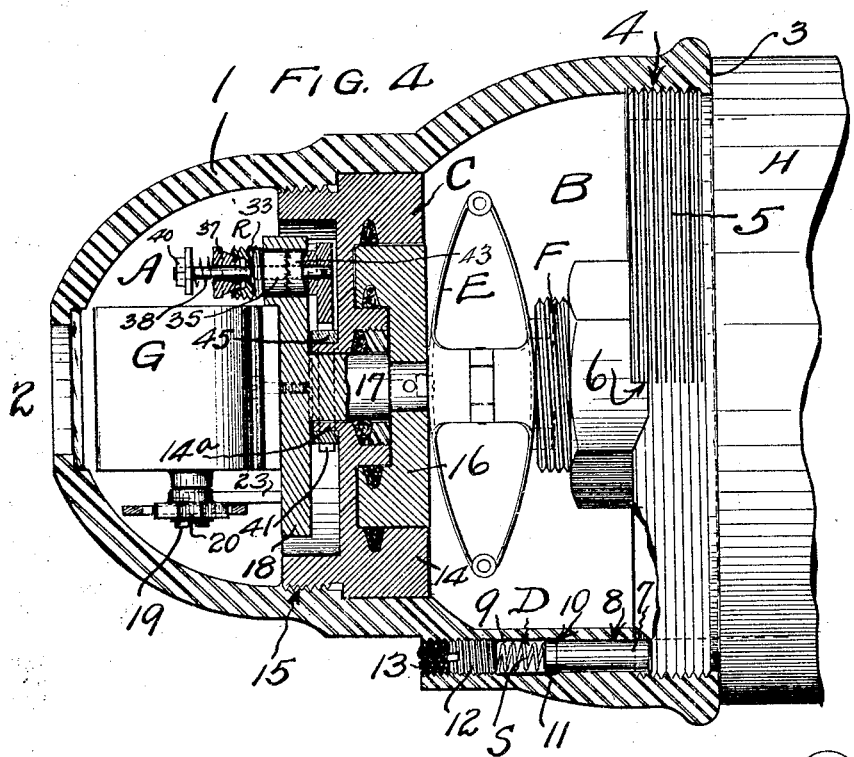
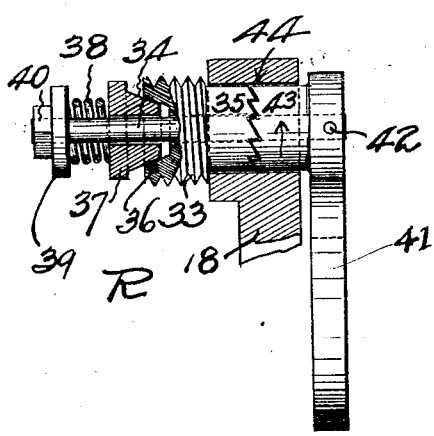
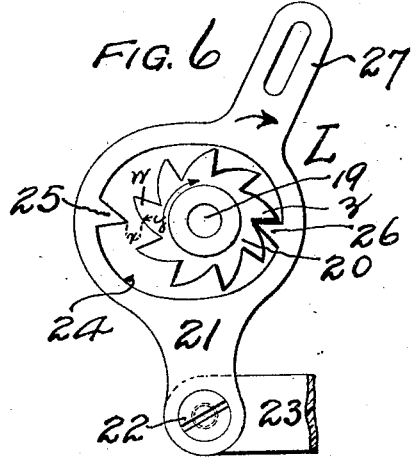
WITNESSES:
INVENTOR
CHARLES D. RICHARD
BY
ATTORNEY

UNITED STATES PATENT OFFICE.

CHARLES DONAT RICHARD, OF NEW YORK, N. Y.

HUB-ODOMETER.

1,326,967.  Specification of Letters Patent.  Patented Jan. 6, 1920.

Application filed December 15, 1917. Serial No. 207,304.

*To all whom it may concern:*

Be it known that I, CHARLES D. RICHARD, a citizen of the Republic of France, residing at New York city, in the county of New York and State of New York, have invented certain new and useful Improvements in Hub-Odometers, of which the following is a specification.

This invention relates to mileage registers, and more especially to devices of this character generally known as hub-odometers which are carried by the hub of a vehicle wheel to indicate the number of miles traveled.

To this end the invention contemplates a novel hub-odometer construction involving special features of construction, whereby the entire hub-odometer may be securely locked to the vehicle wheel hub to prevent the removal thereof by unauthorized persons to alter the registrations thereof, or otherwise tamper with the interior mechanism. In the case of vehicles which are hired out by the day or longer periods of time at predetermined rates per mile, it is essential that the owner thereof be protected by the safe and accurate working of the hub-odometer. Where odometers are merely screwed onto the hub of the wheel without any locking means, it has frequently been found that the odometer has either been entirely removed from the hub and the vehicle driven without operating the registering mechanism or else after the travel period of the vehicle has ceased, the odometer has been removed and the register tampered with. Accordingly, this invention aims to eliminate this objection by providing novel means for automatically locking the entire hub-odometer to the wheel hub.

Another object of the invention is to provide novel operating means for the register device housed within the odometer casing. That is to say, it is proposed to provide novel register operating mechanism, including a series of coöperating instrumentalities which not only combine to accurately and positively drive the register whether the vehicle is traveling backward or forward, but at the same time provide means for preventing any retrograde movement of the register under the shocks and jars incident to travel, to thereby alter the totals indicated by the register.

A further object of the invention is to provide a simple, substantial and practical odometer construction which is reliable and positive in its action, and which is relatively inexpensive to install and maintain.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a vertical sectional view of the improved odometer construction, partly in elevation.

Fig. 2 is a front elevation of the rotor plate, partly showing the register device and its operating mechanism.

Fig. 3 is a detail side elevational view of the register carrying plate and the novel rotary worm device which forms a part of the operating mechanism for the register.

Fig. 4 is a horizontal sectional view showing more clearly the general relation of the operating mechanism for the register device to the rotor element of the odometer.

Fig. 5 is a detail sectional view partly in elevation showing the rotary worm device and the reciprocating operating device which permits of the operation of the worm device in the same direction at all times regardless of the direction of travel of the vehicle.

Fig. 6 is a detail elevational view of the rocking lever element which operates the register device.

Similar reference characters designate corresponding parts throughout the several figures of the drawings.

In carrying the present invention into effect, it is proposed as previously indicated to provide a novel construction whereby the entire odometer may be securely locked to the vehicle hub. Accordingly, in carrying out this object, it is proposed to utilize an odometer casing 1, which may be of the conventional shape and size and provided at its closed end with an inspection window 2 while its opposite enlarged open end 3 is interiorly threaded as indicated at 4, whereby it may be screwed onto the threaded portion 5 of the wheel hub H. In addition to providing the hub H with the threaded portion 5, it is also proposed to form the same with suitable locking shoulders 6 which are so arranged that a locking device designated generally as D and carried by the casing 1 will automatically engage therewith when the casing is screwed onto the hub to prevent any reverse movement of the casing to effect its removal.

This locking device D includes in its organization a yieldable latch or lock pin 7 which is preferably arranged parallel to the axis of the casing and is carried at the edge of the latter in such a manner that the keeper end thereof will be automatically projected outward into the zone of the threads 4 whereby it will be in bearing engagement with the shouldered edge of the hub when the casing is screwed thereon to positively engage therewith to accomplish the desired locking function. In other words, it will be seen that the locking pin 7 is slidably arranged in the bore 8 in the edge of the odometer cap, which bore has one end opening at the inner edge of the threaded portion 4, while the other end opens into an enlarged spring housing chamber 9, thus forming a shoulder 10 which constitutes an abutment for the rear end of the said pin which is of enlarged diameter as indicated at 11 to provide a head portion which prevents the said pin from being projected clear through the bore 8 by the pressure of the spring S, which bears against the rear end thereof. This spring 9, as will be observed from Fig. 4, is confined between the head of the locking pin 7 and a screw plug 12 which is fitted into the open threaded end of the enlarged spring housing chamber 9 to properly tension the same and thereby provide a yieldable mounting for the locking pin 7. In order to fully conceal the locking means, it is proposed to close the open exposed end of the chamber 9 with a suitable seal 13 whereby it will be impossible for unauthorized persons to obtain access to the slotted end of the screw plug 12 to manipulate the same and cause the withdrawal of the spring 9 and locking pin 7, without rupturing the seal. Accordingly, it will be apparent that the provision of the locking device D having the novel features above described, will positively and automatically lock the entire hub-odometer on the wheel hub, and since the tensioning plug 12 for the spring 9 is entirely concealed by the seal 13, the locking device is amply protected from fraudulent tampering which is very important since the safety and inaccessibility of the register mechanism is a necessary feature in the use of hub-odometers.

Referring now more particularly to the mechanism within the casing, it may be observed that the interior of the casing is divided into two compartments A and B by means of a partition C which essentially consists of a rotor element 14 having a threaded engagement as at 15 with the interior of the casing, and a stator element 16 nested within the rotor element and held in a fixed position by means of a novel reticulated coupling device E, which connects one side of the stator with the stationary axle F of the vehicle. Connected with the stator 16, which as previously pointed out, remains in a fixed position while the rotor 14 rotates with the hub-cap, is the supporting post 17 of a register carrying plate 18, which latter is located in the register housing A and carries therewith a register device preferably of the rotary type and designated generally as G.

This register device G has an operating shaft 19 having mounted thereon an operating wheel 20 provided with a plurality of ratchet teeth which are flat on one side and curved on the other, and this wheel is driven by a novel operating mechanism, which includes a rocking lever element L, a rotary worm device R, and suitable connections between the latter and the rotor element 14. The rocking lever element which engages directly with the ratchet periphery of the operating wheel 20 is designated generally as 21, and is pivotally supported as indicated at 22 on the offset bracket arm 23 of the carrier plate 18. The intermediate portion of this rocking lever element 21 is of open formation. That is to say, the central portion thereof is enlarged and provided with a substantially oval-shaped wheel clearance opening 24, and is also provided at substantially diametrically opposite points with the advancing pawls 25 and 26 which project into the wheel clearance opening 24 and are adapted to alternately engage the curved sides of the teeth of the wheel 20 to advance the same, while the flat faces thereof to operate as a check to prevent unnecessary movement. The upper end of this lever is provided with a slotted actuating arm 27 which is engaged by a wrist-pin 28 carried by a disk 29 on the main operating shaft 30 of the rotary worm device previously referred to, whereby the entire lever may be given a rocking motion.

Accordingly, it will be apparent that when the lever element 21 is rocked on its pivot 22 the pawls 25 and 26 which project in the clearance opening 24 thereof, will alternately engage the wheel 20 to advance the same and alternately act as a stop or check in such a manner that when one tooth comes into position to cause the wheel to advance, the other will cease to be a check. That is to say, by reference to Fig. 6, it will be observed that, when 26 is engaged with the flat side of one of the ratchet teeth of the wheel 20 in such a manner that the same is locked against rotation in either direction, and the lever is rocked in the direction of the arrow said pawl 26 will be drawn clear of the flat side of the tooth with which it has been engaged while the point of the pawl 25 is moving the distance $x$, and when the latter pawl 25 engages the intermediate portion $y$ of the curved side of the tooth adjacent thereto, it will cause a movement of the wheel 20 through the camming engagement of the said pawl 25 with the said curved side of the tooth $w$. It will, of course, be understood that by the time the point of the pawl 25 reaches the point $y$, the point of the other pawl 26 will have cleared the extremity of the tooth $z$, and, therefore, it will be clear that the initial rocking movement of the lever withdraws one pawl from locking engagement with the ratchet wheel while the remaining movement in the same direction, causes the wheel to move. This same action takes place in the reverse order when the lever 21 rocks in the direction opposite the arrow in Fig. 6. Accordingly, it will be apparent that a rocking movement of the lever 21 on its pivot 22 will impart a rotary movement to the wheel 20 which will be intermittent or substantially continuous according to the speed at which the lever 21 rocks.

Referring now more particularly to the portion of the operating mechanism which includes the main operating shaft 30, namely the rotary worm device designated generally as R, it will be seen from Fig. 2 that the said shaft is journaled in the offset bracket arms 31 carried by the plate 18, and the end of said shaft opposite the wrist-pin connection with the rocking lever 21 is provided with the worm pinion 32 which meshes with a master worm 33. This master worm of the worm device R is loosely mounted on a supporting spindle 34 and has at one end thereof a ratchet head 35 while the opposite end thereof is formed with a socket 36 to receive a friction brake member 37 also loosely mounted on the spindle 34 and carried on a brake arm 37$^a$ which is pivotally fastened to the offset arm 37$^b$ of the plate 18. This friction brake member is held in engagement with the wall of the socket 36 in the worm 33 by means of a compression spring 38 confined between the rear face of the brake head and an abutment washer 39 held on the end of the spindle 34 by a nut 40, and the effect of this brake is to prevent all movement of worm 33 except that in the proper direction, i. e., the movement imparted thereto by the positive engagement of the two ratchet members presently referred to.

The end of the spindle 34 opposite the nut 40 has rigidly fitted thereto an operating connection with the rotor 14, which is preferably in the form of a yoke 41 rigidly fastened to the end of the spindle by suitable means such as the pin 42 and carrying therewith a ratchet head 43 for engaging with the ratchet head 35 of the master worm 33. These members 35 and 43 are normally maintained in engagement by means of the compression spring 38 referred to, and together are mounted in the bearing opening 44 of the plate 18 as will be apparent from Fig. 5. With the arrangement of ratchet faces shown, it will be apparent that any movement imparted to the yoke 41 which tends to move the ratchet head 43 in the direction of the arrow will impart a similar motion to the master worm 33, while a reverse movement of the yoke will permit the teeth of the head 43 to trail idly backward over the teeth of the head 35, whereby the yoke 41 can only impart a rotary movement in one direction to the master worm 33.

In connection with the reciprocating yoke 41 which constitutes the operative connection between the rotary worm device and the rotor element, it may be noted that the means for operating this yoke is such that rotary movement in the same direction will be imparted to the worm device regardless of the direction of movement of the wheel whose hub carries the odometer. And, in order to provide for this feature of the invention, the rotor element 14 is provided with a projecting hub portion 14$^a$ which carries therewith a cam 45 adapted to work within the bifurcated arms of the yoke 41 to impart an oscillating movement thereto, which oscillating movement is converted into rotary motion by the ratchet or clutch arrangement between the yoke and the master worm of the rotor worm device. Accordingly, it will be apparent that the connection between the rotary worm device and the rotor element 14 is an oscillating yoke device, controlled by the movement of a cam carried by the rotor element.

From the foregoing, it will be apparent that after the hub-odometer assembly has been fitted to the hub H of the vehicle wheel and locked thereto, by means of the novel locking device D, the casing 1 will rotate with the hub while the register device G will be held stationary before the inspection window 2 because of its connection with the stator element 16 which is held fixed through the articulated coupling E connected with the fixed axle F of the vehicle. The rotation of the casing 1 also causes a rotation of the rotor 14 carrying therewith the cam 45, and this cam imparts an oscillating motion to the yoke element 41, and the latter in turn imparts a continuous rotary motion to the master worm 33 through the arrangement of the ratchet members 35 and 43. The rotary movement of the worm 33 is transmitted through the pinion 32 to the main operating shaft 30, and the latter through the disk 29 and the wrist-pin 38, imparts a rocking motion to the lever element 21 which operates the register wheel 20 as previously explained. Therefore, it is believed to be apparent that the present construction provides novel and effective means for driving the register mechanism which is reliable and positive in its action and carries out the objects heretofore referred to.

Without further description, it is thought that the many features and advantages of the invention will be readily apparent, and it will, of course, be understood that minor changes in the form, proportion and details of construction may be resorted to without departing from the spirit of the invention or scope of the appended claims.

I claim:

1. A register mechanism for hub odometers including in combination with the rotor element, stator element, and a register carried thereby, register wheel operating means, a driving unit including means for transmitting motion at a right angle consisting of a spindle, a spiral gear loosely mounted on said spindle and having a ratchet face at one end, said spiral gear engaging register wheel operating means, a lever carried by the spindle at right angles thereto and having a ratchet hub for engaging with the ratchet face of the spiral gear, said lever having a part in direct operative engagement with the rotor.

2. A register operating mechanism for hub odometers including a rotary gear device consisting of a spindle, a gear having a ratchet face at one end and a socket at the other loosely mounted on the spindle, an oscillating lever mounted on the shaft and having a hub portion provided with a ratchet face for engaging with the ratchet face of the gear, a friction brake element for the gear consisting of a lever pivoted at one end and provided at its other end with a cone for engaging in the socket of the gear, an abutment at the end of the spindle, a spring between the abutment and the friction brake for yieldingly pressing the same into engagement with the gear to hold the ratchet faces of the latter and the lever in engagement, and register-wheel operating means engaging said gear.

3. The herein described means for fastening a hub-odometer casing to a wheel axle comprising in combination with the wheel hub having locking shoulders thereon, of an odometer casing having a concealed bore therein, a latch member mounted in the bore, a tension plug mounted in one end of the bore, a spring confined between the tension plug and the latch, and a seal for filling the exposed end of the bore after the plug has been inserted therein to prevent access to the plug.

In testimony whereof I hereunto affix my signature in the presence of two witnesses.

CHARLES DONAT RICHARD.

Witnesses:
GEO. J. CORBETT,
KENNETH JACKSON.